(12) United States Patent
Masuda et al.

(10) Patent No.: US 11,953,736 B2
(45) Date of Patent: Apr. 9, 2024

(54) FIBER CONNECTION STRUCTURE WITH OPTICAL CONNECTOR, AND MODULE

(71) Applicants: SUMITOMO ELECTRIC INDUSTRIES, LTD., Osaka (JP); SUMITOMO ELECTRIC OPTIFRONTIER CO., LTD., Yokohama (JP)

(72) Inventors: Kazuya Masuda, Osaka (JP); Takahiro Inaba, Yokohama (JP); Tomohiko Ueda, Osaka (JP)

(73) Assignees: SUMITOMO ELECTRIC INDUSTRIES, LTD., Osaka (JP); SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 105 days.

(21) Appl. No.: 17/791,500

(22) PCT Filed: Feb. 18, 2020

(86) PCT No.: PCT/JP2020/006350
§ 371 (c)(1),
(2) Date: Jul. 7, 2022

(87) PCT Pub. No.: WO2021/166084
PCT Pub. Date: Aug. 26, 2021

(65) Prior Publication Data
US 2023/0028161 A1 Jan. 26, 2023

(51) Int. Cl.
*H04B 10/00* (2013.01)
*G02B 6/38* (2006.01)
*G02B 6/44* (2006.01)

(52) U.S. Cl.
CPC ......... *G02B 6/3885* (2013.01); *G02B 6/3825* (2013.01); *G02B 6/3895* (2013.01); *G02B 6/4403* (2013.01)

(58) Field of Classification Search
CPC .. G02B 6/3885; G02B 6/3825; G02B 6/3895; G02B 6/4403; G02B 6/444; G02B 6/4482
See application file for complete search history.

(56) References Cited

U.S. PATENT DOCUMENTS 6,222,976 B1 * 4/2001 Shahid ................. G02B 6/3885
385/136
6,256,443 B1 * 7/2001 Uruno .................. G02B 6/4482
385/134

(Continued)

FOREIGN PATENT DOCUMENTS

JP 2001-042136 A 2/2001
JP 2003-167134 A 6/2003

(Continued)

*Primary Examiner* — Agustin Bello
(74) *Attorney, Agent, or Firm* — Oliff PLC

(57) ABSTRACT

In a fiber connection structure with optical connectors according to one embodiment, among m first connector port groups, arrangement orders of colors of a plurality of the optical fibers in (2×j−1)th (j is a natural number satisfying 1≤j and 2×j≤m) first connector port groups are the same, and among the m first connector port groups, arrangement orders of the colors of the plurality of optical fibers in (2×j)th first connector port groups are the same. The arrangement order of the colors of the plurality of optical fibers in the (2×j)th first connector port group is a reverse order of the arrangement order of the colors of the plurality of optical fibers in the (2×j−1)th first connector port group.

11 Claims, 12 Drawing Sheets

(56) References Cited

U.S. PATENT DOCUMENTS

| | | | | |
|---|---|---|---|---|
| 6,324,325 B1* | 11/2001 | Booth | G02B 6/04 | 385/114 |
| 6,351,590 B1* | 2/2002 | Shahid | G02B 6/4472 | 385/136 |
| 6,655,848 B2* | 12/2003 | Simmons | G02B 6/3878 | 385/56 |
| 6,763,166 B2* | 7/2004 | Yow, Jr. | G02B 6/4472 | 385/134 |
| 6,775,458 B2* | 8/2004 | Yow, Jr. | G02B 6/4472 | 385/137 |
| 7,147,383 B2* | 12/2006 | Sullivan | G02B 6/3878 | 385/59 |
| 7,184,635 B2* | 2/2007 | Livingston | G02B 6/3885 | 385/71 |
| 7,237,966 B2* | 7/2007 | Quinby | G02B 6/3851 | 385/100 |
| 7,689,079 B2* | 3/2010 | Burnham | G02B 6/4453 | 398/55 |
| 8,873,967 B2* | 10/2014 | Barnes | G02B 6/4453 | 385/71 |
| 9,097,873 B2* | 8/2015 | Conner | G02B 6/2804 | |
| 9,229,175 B2* | 1/2016 | Barnes | G02B 6/3895 | |
| 9,316,803 B2* | 4/2016 | Manes | G02B 6/4453 | |
| 10,042,137 B2* | 8/2018 | Conrad | G02B 6/448 | |
| 10,585,257 B1* | 3/2020 | Smith | G02B 6/4482 | |
| 10,678,012 B1* | 6/2020 | Wu | G02B 6/562 | |
| 10,809,482 B2* | 10/2020 | Childers | G02B 6/3897 | |
| 10,908,362 B1* | 2/2021 | Janta-Polczynski | G02B 6/3839 | |
| 11,573,389 B2* | 2/2023 | Schneider | G02B 6/3608 | |
| 11,592,628 B2* | 2/2023 | Murray | G02B 6/3879 | |
| 11,609,400 B2* | 3/2023 | Marcouiller | G02B 6/448 | |
| 11,703,652 B2* | 7/2023 | Wu | G02B 6/4472 | 385/17 |
| 2003/0031436 A1* | 2/2003 | Simmons | G02B 6/3878 | 385/136 |
| 2003/0031449 A1* | 2/2003 | Simmons | G02B 6/3807 | 385/134 |
| 2003/0031452 A1* | 2/2003 | Simmons | G02B 6/3878 | 385/100 |
| 2003/0053772 A1 | 3/2003 | Ikunishi et al. | | |
| 2004/0037523 A1 | 2/2004 | Yow et al. | | |
| 2004/0037534 A1* | 2/2004 | Yow, Jr. | G02B 6/4472 | 385/137 |
| 2004/0126069 A1* | 7/2004 | Jong | G02B 6/3878 | 385/109 |
| 2006/0029334 A1* | 2/2006 | Quinby | G02B 6/3851 | 385/71 |
| 2009/0196563 A1* | 8/2009 | Mullsteff | G02B 6/4453 | 385/135 |
| 2010/0195955 A1* | 8/2010 | Burnham | G02B 6/3897 | 385/24 |
| 2010/0322554 A1* | 12/2010 | Barnes | G02B 6/3502 | 385/71 |
| 2010/0322562 A1* | 12/2010 | Barnes | G02B 6/3885 | 385/59 |
| 2010/0322576 A1 | 12/2010 | Rhoney et al. | | |
| 2011/0085774 A1* | 4/2011 | Murphy | G02B 6/3893 | 264/1.25 |
| 2012/0082416 A1 | 4/2012 | Katoh | | |
| 2012/0093468 A1* | 4/2012 | Keller | G02B 6/4411 | 385/106 |
| 2013/0163932 A1* | 6/2013 | Cooke | G02B 6/4472 | 385/100 |
| 2013/0330043 A1* | 12/2013 | Goldsmith | G02B 6/4452 | 385/70 |
| 2014/0079365 A1* | 3/2014 | Hill | G02B 6/4455 | 385/135 |
| 2014/0105539 A1* | 4/2014 | Conner | G02B 6/4471 | 385/24 |
| 2014/0219615 A1* | 8/2014 | Petersen | G02B 6/3895 | 385/88 |
| 2015/0093084 A1* | 4/2015 | Cooke | G02B 6/4477 | 385/113 |
| 2017/0045700 A1* | 2/2017 | Conrad | G02B 6/4471 | |
| 2017/0153403 A1* | 6/2017 | Trott | G02B 6/441 | |
| 2018/0275356 A1 | 9/2018 | Li et al. | | |
| 2018/0321454 A1* | 11/2018 | Sato | G02B 6/448 | |
| 2019/0154929 A1* | 5/2019 | Moffat | G02B 6/3881 | |
| 2019/0219788 A1* | 7/2019 | Childers | G02B 6/4452 | |
| 2019/0243084 A1* | 8/2019 | Billman | G02B 6/4471 | |
| 2020/0103604 A1* | 4/2020 | Bradley | G02B 6/3861 | |
| 2020/0192041 A1* | 6/2020 | Griffiths | G02B 6/443 | |
| 2020/0310056 A1* | 10/2020 | Boratav | G02B 6/448 | |
| 2021/0165180 A1* | 6/2021 | Chiasson | G02B 6/4403 | |
| 2021/0341691 A1* | 11/2021 | Sutherland | G02B 6/3616 | |
| 2022/0026652 A1* | 1/2022 | Kuramitsu | G02B 6/443 | |
| 2022/0075137 A1* | 3/2022 | Womack | G02B 6/4482 | |
| 2022/0082758 A1* | 3/2022 | Nguyen | G02B 6/3898 | |
| 2022/0091352 A1* | 3/2022 | Ellwanger | G02B 6/4482 | |
| 2022/0137296 A1* | 5/2022 | Wu | G02B 6/381 | 385/96 |
| 2022/0317400 A1* | 10/2022 | Chalk | G02B 6/4403 | |
| 2023/0028161 A1* | 1/2023 | Masuda | G02B 6/3895 | |
| 2023/0096710 A1* | 3/2023 | Claessens | G02B 6/4452 | 385/135 |

FOREIGN PATENT DOCUMENTS

| | | |
|---|---|---|
| JP | 2005-500565 A | 1/2005 |
| JP | 2008-059004 A | 3/2008 |
| JP | 2012-078513 A | 4/2012 |
| JP | 2012-516470 A | 7/2012 |
| WO | 03/016975 A2 | 2/2003 |
| WO | 2010/088012 A1 | 8/2010 |

* cited by examiner

Fig.6A

ORDER OF COLORS OF OPTICAL FIBERS

| NUMBER OF CONNECTOR PORT GROUP | 1 | 2 | 3 | 4 | 5 | 6 | 7 | 8 | 9 | 10 | 11 | 12 |
|---|---|---|---|---|---|---|---|---|---|---|---|---|
| 1 | BLUE | ORANGE | GREEN | BROWN | GRAY | WHITE | RED | BLACK | YELLOW | PURPLE | PINK | LIGHT BLUE |
| 2 | LIGHT BLUE | PINK | PURPLE | YELLOW | BLACK | RED | WHITE | GRAY | BROWN | GREEN | ORANGE | BLUE |
| 3 | BLUE | ORANGE | GREEN | BROWN | GRAY | WHITE | RED | BLACK | YELLOW | PURPLE | PINK | LIGHT BLUE |
| 4 | LIGHT BLUE | PINK | PURPLE | YELLOW | BLACK | RED | WHITE | GRAY | BROWN | GREEN | ORANGE | BLUE |
| 5 | BLUE | ORANGE | GREEN | BROWN | GRAY | WHITE | RED | BLACK | YELLOW | PURPLE | PINK | LIGHT BLUE |
| 6 | LIGHT BLUE | PINK | PURPLE | YELLOW | BLACK | RED | WHITE | GRAY | BROWN | GREEN | ORANGE | BLUE |
| 7 | BLUE | ORANGE | GREEN | BROWN | GRAY | WHITE | RED | BLACK | YELLOW | PURPLE | PINK | LIGHT BLUE |
| 8 | LIGHT BLUE | PINK | PURPLE | YELLOW | BLACK | RED | WHITE | GRAY | BROWN | GREEN | ORANGE | BLUE |
| 9 | BLUE | ORANGE | GREEN | BROWN | GRAY | WHITE | RED | BLACK | YELLOW | PURPLE | PINK | LIGHT BLUE |
| 10 | LIGHT BLUE | PINK | PURPLE | YELLOW | BLACK | RED | WHITE | GRAY | BROWN | GREEN | ORANGE | BLUE |
| 11 | BLUE | ORANGE | GREEN | BROWN | GRAY | WHITE | RED | BLACK | YELLOW | PURPLE | PINK | LIGHT BLUE |
| 12 | LIGHT BLUE | PINK | PURPLE | YELLOW | BLACK | RED | WHITE | GRAY | BROWN | GREEN | ORANGE | BLUE |

Fig.6B

ORDER OF COLORS OF OPTICAL FIBERS

| NUMBER OF CONNECTOR PORT GROUP | 1 | 2 | 3 | 4 | 5 | 6 | 7 | 8 | 9 | 10 | 11 | 12 |
|---|---|---|---|---|---|---|---|---|---|---|---|---|
| 1 | BLUE | LIGHT BLUE | BLUE | LIGHT BLUE | BLUE | LIGHT BLUE | BLUE | LIGHT BLUE | BLUE | LIGHT BLUE | BLUE | LIGHT BLUE |
| 2 | ORANGE | PINK | ORANGE | PINK | ORANGE | PINK | ORANGE | PINK | ORANGE | PINK | ORANGE | PINK |
| 3 | GREEN | PURPLE | GREEN | PURPLE | GREEN | PURPLE | GREEN | PURPLE | GREEN | PURPLE | GREEN | PURPLE |
| 4 | BROWN | YELLOW | BROWN | YELLOW | BROWN | YELLOW | BROWN | YELLOW | BROWN | YELLOW | BROWN | YELLOW |
| 5 | GRAY | BLACK | GRAY | BLACK | GRAY | BLACK | GRAY | BLACK | GRAY | BLACK | GRAY | BLACK |
| 6 | WHITE | RED | WHITE | RED | WHITE | RED | WHITE | RED | WHITE | RED | WHITE | RED |
| 7 | RED | WHITE | RED | WHITE | RED | WHITE | RED | WHITE | RED | WHITE | RED | WHITE |
| 8 | BLACK | GRAY | BLACK | GRAY | BLACK | GRAY | BLACK | GRAY | BLACK | GRAY | BLACK | GRAY |
| 9 | YELLOW | BROWN | YELLOW | BROWN | YELLOW | BROWN | YELLOW | BROWN | YELLOW | BROWN | YELLOW | BROWN |
| 10 | PURPLE | GREEN | PURPLE | GREEN | PURPLE | GREEN | PURPLE | GREEN | PURPLE | GREEN | PURPLE | GREEN |
| 11 | PINK | ORANGE | PINK | ORANGE | PINK | ORANGE | PINK | ORANGE | PINK | ORANGE | PINK | ORANGE |
| 12 | LIGHT BLUE | BLUE | LIGHT BLUE | BLUE | LIGHT BLUE | BLUE | LIGHT BLUE | BLUE | LIGHT BLUE | BLUE | LIGHT BLUE | BLUE |

Fig.7A

ORDER OF COLORS OF OPTICAL FIBERS

| NUMBER OF CONNECTOR PORT GROUP | 1 | 2 | 3 | 4 | 5 | 6 | 7 | 8 | 9 | 10 | 11 | 12 |
|---|---|---|---|---|---|---|---|---|---|---|---|---|
| 1 | BLUE | RED | YELLOW | WHITE | BROWN | GRAY | BLUE | RED | YELLOW | WHITE | BROWN | GRAY |
| 2 | GRAY | BROWN | WHITE | YELLOW | RED | BLUE | GRAY | BROWN | WHITE | YELLOW | RED | BLUE |
| 3 | BLUE | RED | YELLOW | WHITE | BROWN | GRAY | BLUE | RED | YELLOW | WHITE | BROWN | GRAY |
| 4 | GRAY | BROWN | WHITE | YELLOW | RED | BLUE | GRAY | BROWN | WHITE | YELLOW | RED | BLUE |
| 5 | BLUE | RED | YELLOW | WHITE | BROWN | GRAY | BLUE | RED | YELLOW | WHITE | BROWN | GRAY |
| 6 | GRAY | BROWN | WHITE | YELLOW | RED | BLUE | GRAY | BROWN | WHITE | YELLOW | RED | BLUE |
| 7 | BLUE | RED | YELLOW | WHITE | BROWN | GRAY | BLUE | RED | YELLOW | WHITE | BROWN | GRAY |
| 8 | GRAY | BROWN | WHITE | YELLOW | RED | BLUE | GRAY | BROWN | WHITE | YELLOW | RED | BLUE |
| 9 | BLUE | RED | YELLOW | WHITE | BROWN | GRAY | BLUE | RED | YELLOW | WHITE | BROWN | GRAY |
| 10 | GRAY | BROWN | WHITE | YELLOW | RED | BLUE | GRAY | BROWN | WHITE | YELLOW | RED | BLUE |
| 11 | BLUE | RED | YELLOW | WHITE | BROWN | GRAY | BLUE | RED | YELLOW | WHITE | BROWN | GRAY |
| 12 | GRAY | BROWN | WHITE | YELLOW | RED | BLUE | GRAY | BROWN | WHITE | YELLOW | RED | BLUE |

Fig. 7B

ORDER OF COLORS OF OPTICAL FIBERS

| NUMBER OF CONNECTOR PORT GROUP | 1 | 2 | 3 | 4 | 5 | 6 | 7 | 8 | 9 | 10 | 11 | 12 |
|---|---|---|---|---|---|---|---|---|---|---|---|---|
| 1 | BLUE | GRAY | BLUE | GRAY | BLUE | GRAY | BLUE | GRAY | BLUE | GRAY | BLUE | GRAY |
| 2 | RED | BROWN | RED | BROWN | RED | BROWN | RED | BROWN | RED | BROWN | RED | BROWN |
| 3 | YELLOW | WHITE | YELLOW | WHITE | YELLOW | WHITE | YELLOW | WHITE | YELLOW | WHITE | YELLOW | WHITE |
| 4 | WHITE | YELLOW | WHITE | YELLOW | WHITE | YELLOW | WHITE | YELLOW | WHITE | YELLOW | WHITE | YELLOW |
| 5 | BROWN | RED | BROWN | RED | BROWN | RED | BROWN | RED | BROWN | RED | BROWN | RED |
| 6 | GRAY | BLUE | GRAY | BLUE | GRAY | BLUE | GRAY | BLUE | GRAY | BLUE | GRAY | BLUE |
| 7 | BLUE | GRAY | BLUE | GRAY | BLUE | GRAY | BLUE | GRAY | BLUE | GRAY | BLUE | GRAY |
| 8 | RED | BROWN | RED | BROWN | RED | BROWN | RED | BROWN | RED | BROWN | RED | BROWN |
| 9 | YELLOW | WHITE | YELLOW | WHITE | YELLOW | WHITE | YELLOW | WHITE | YELLOW | WHITE | YELLOW | WHITE |
| 10 | WHITE | YELLOW | WHITE | YELLOW | WHITE | YELLOW | WHITE | YELLOW | WHITE | YELLOW | WHITE | YELLOW |
| 11 | BROWN | RED | BROWN | RED | BROWN | RED | BROWN | RED | BROWN | RED | BROWN | RED |
| 12 | GRAY | BLUE | GRAY | BLUE | GRAY | BLUE | GRAY | BLUE | GRAY | BLUE | GRAY | BLUE |

Fig.9A

| NUMBER OF CONNECTOR PORT GROUP | \ | ORDER OF COLORS OF OPTICAL FIBERS | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| 1 | | BLUE | RED | YELLOW | WHITE | BROWN | GRAY | BLUE | RED | YELLOW | WHITE | BROWN | GRAY |
| 2 | | BLUE | RED | YELLOW | WHITE | BROWN | GRAY | BLUE | RED | YELLOW | WHITE | BROWN | GRAY |
| 3 | | BLUE | RED | YELLOW | WHITE | BROWN | GRAY | BLUE | RED | YELLOW | WHITE | BROWN | GRAY |
| 4 | | BLUE | RED | YELLOW | WHITE | BROWN | GRAY | BLUE | RED | YELLOW | WHITE | BROWN | GRAY |
| 5 | | BLUE | RED | YELLOW | WHITE | BROWN | GRAY | BLUE | RED | YELLOW | WHITE | BROWN | GRAY |
| 6 | | BLUE | RED | YELLOW | WHITE | BROWN | GRAY | BLUE | RED | YELLOW | WHITE | BROWN | GRAY |
| 7 | | BLUE | RED | YELLOW | WHITE | BROWN | GRAY | BLUE | RED | YELLOW | WHITE | BROWN | GRAY |
| 8 | | BLUE | RED | YELLOW | WHITE | BROWN | GRAY | BLUE | RED | YELLOW | WHITE | BROWN | GRAY |
| 9 | | BLUE | RED | YELLOW | WHITE | BROWN | GRAY | BLUE | RED | YELLOW | WHITE | BROWN | GRAY |
| 10 | | BLUE | RED | YELLOW | WHITE | BROWN | GRAY | BLUE | RED | YELLOW | WHITE | BROWN | GRAY |
| 11 | | BLUE | RED | YELLOW | WHITE | BROWN | GRAY | BLUE | RED | YELLOW | WHITE | BROWN | GRAY |
| 12 | | BLUE | RED | YELLOW | WHITE | BROWN | GRAY | BLUE | RED | YELLOW | WHITE | BROWN | GRAY |

Fig.9B

ORDER OF COLORS OF OPTICAL FIBERS

| NUMBER OF CONNECTOR PORT GROUP | 1 | 2 | 3 | 4 | 5 | 6 | 7 | 8 | 9 | 10 | 11 | 12 |
|---|---|---|---|---|---|---|---|---|---|---|---|---|
| 1 | BLUE | BLUE | BLUE | BLUE | BLUE | BLUE | BLUE | BLUE | BLUE | BLUE | BLUE | BLUE |
| 2 | RED | RED | RED | RED | RED | RED | RED | RED | RED | RED | RED | RED |
| 3 | YELLOW | YELLOW | YELLOW | YELLOW | YELLOW | YELLOW | YELLOW | YELLOW | YELLOW | YELLOW | YELLOW | YELLOW |
| 4 | WHITE | WHITE | WHITE | WHITE | WHITE | WHITE | WHITE | WHITE | WHITE | WHITE | WHITE | WHITE |
| 5 | BROWN | BROWN | BROWN | BROWN | BROWN | BROWN | BROWN | BROWN | BROWN | BROWN | BROWN | BROWN |
| 6 | GRAY | GRAY | GRAY | GRAY | GRAY | GRAY | GRAY | GRAY | GRAY | GRAY | GRAY | GRAY |
| 7 | BLUE | BLUE | BLUE | BLUE | BLUE | BLUE | BLUE | BLUE | BLUE | BLUE | BLUE | BLUE |
| 8 | RED | RED | RED | RED | RED | RED | RED | RED | RED | RED | RED | RED |
| 9 | YELLOW | YELLOW | YELLOW | YELLOW | YELLOW | YELLOW | YELLOW | YELLOW | YELLOW | YELLOW | YELLOW | YELLOW |
| 10 | WHITE | WHITE | WHITE | WHITE | WHITE | WHITE | WHITE | WHITE | WHITE | WHITE | WHITE | WHITE |
| 11 | BROWN | BROWN | BROWN | BROWN | BROWN | BROWN | BROWN | BROWN | BROWN | BROWN | BROWN | BROWN |
| 12 | GRAY | GRAY | GRAY | GRAY | GRAY | GRAY | GRAY | GRAY | GRAY | GRAY | GRAY | GRAY |

FIBER CONNECTION STRUCTURE WITH OPTICAL CONNECTOR, AND MODULE

TECHNICAL FIELD

One aspect of the present disclosure relates to a fiber connection structure with optical connectors, and a module.

BACKGROUND ART

Patent Literature 1 discloses an optical fiber connection structure to which a plurality of optical fibers are wired. The optical fiber connection structure includes a plurality of optical fibers extending to one side of a housing, and a plurality of optical fibers extending to the other side of the housing. First to fourth optical fiber groups each including four optical fibers extend to the one side of the housing, and first to fourth optical fiber groups each including four optical fibers also extend to the other side of the housing. The four optical fibers in each of the optical fiber groups are arranged in one row.

The colors of the four optical fibers in each of the optical fiber groups are different from each other. The colors of the optical fibers of each of the first to fourth optical fiber groups extending to the one side of the housing and the colors of the optical fibers of each of the first to fourth optical fiber groups extending to the other side of the housing are the same. In addition, in the first to fourth optical fiber groups, the arrangement orders of the colors of the four optical fibers are different from each other. Since the arrangement order of the colors of the optical fibers differs for each optical fiber group in such a manner, it is possible to identify which of the first to fourth groups the optical fiber group belongs to. Incidentally, Patent Literature 2 discloses an optical fiber connection structure including the same optical fiber groups as in Patent Literature 1.

CITATION LIST

Patent Literature

Patent Literature 1: U.S. Unexamined Patent Publication No. 2004/0037523
Patent Literature 2: U.S. Unexamined Patent Publication No. 2004/0037534

SUMMARY OF INVENTION

A fiber connection structure with optical connectors according to one aspect of the present disclosure includes: a plurality of optical fibers; a plurality of first connector port groups each including a plurality of optical fiber holding holes to which one ends of the plurality of optical fibers are wired; and a plurality of second connector port groups each including a plurality of optical fiber holding holes to which the other ends of the plurality of optical fibers are wired. n optical fibers are wired to each of in first connector port groups, where in is a natural number satisfying 2≤m and n is a natural number satisfying 2≤n. m optical fibers are wired to each of n second connector port groups. One optical fiber from one first connector port group is wired to each of the n second connector port groups. The n optical fibers are wired to the one first connector port group in an arranged state. The in optical fibers are wired to one second connector port group in an arranged state. Among the n optical fibers wired to the one first connector port group, a color of a kth optical fiber and a color of an (n−k+1)th optical fiber are different from each other, where k is a natural number satisfying 1≤k≤n. Among the in first connector port groups, arrangement orders of colors of the plurality of optical fibers in (2×j−1)th first connector port groups are the same, where j is a natural number satisfying 1≤j and 2×j≤m. Among the in first connector port groups, arrangement orders of the colors of the plurality of optical fibers in (2×j)th first connector port groups are the same. The arrangement order of the colors of the plurality of optical fibers in the (2×j)th first connector port group is a reverse order of the arrangement order of the colors of the plurality of optical fibers in the (2×j−1)th first connector port group.

A fiber connection structure with optical connectors according to another aspect of the present disclosure includes: a plurality of optical fibers; a plurality of first connector port groups each including a plurality of optical fiber holding holes to which one ends of the plurality of optical fibers are wired; and a plurality of second connector port groups each including a plurality of optical fiber holding holes to which the other ends of the plurality of optical fibers are wired. n optical fibers are wired to each of in first connector port groups, where in is a natural number satisfying 2≤m and n is a natural number satisfying 2≤n. m optical fibers are wired to each of n second connector port groups. One optical fiber from one first connector port group is wired to each of the n second connector port groups. The n optical fibers are wired to the one first connector port group in an arranged state. The in optical fibers are wired to one second connector port group in an arranged state. Among the n optical fibers wired to the one first connector port group, a color of a kth optical fiber and a color of an (n−k+1)th optical fiber are different from each other, where k is a natural number satisfying 1≤k≤n. The optical fibers having two colors among colors of the optical fibers wired to the one first connector port group are wired to the one second connector port group. In the one second connector port group, the colors of the optical fibers disposed adjacent to each other are different from each other.

A module according to one aspect of the present disclosure includes: the fiber connection structure with optical connectors described above; a first adapter to which a first multi-core connector is connected; a first wall surface that exposes and supports the first adapter; a second adapter to which a second multi-core connector is connected; and a second wall surface that exposes and supports the second adapter. The fiber connection structure with optical connectors optically connects the first adapter and the second adapter.

BRIEF DESCRIPTION OF DRAWINGS

FIG. 6A is a table showing an example of colors of the plurality of optical fibers in the fiber connection structure with optical connectors of FIG. 5.

FIG. 6B is a table showing an example of colors of the plurality of optical fibers in the fiber connection structure with optical connectors of FIG. 5.

FIG. 7A is a table showing an example of colors of a plurality of optical fibers in a fiber connection structure with optical connectors according to a second embodiment.

FIG. 7B is a table showing an example of colors of the plurality of optical fibers in the fiber connection structure with optical connectors according to the second embodiment.

FIG. 9A is a table showing an example of colors of a plurality of optical fiber connection structures in an optical fiber connection structure of the related art.

FIG. 9B is a table showing an example of colors of the plurality of optical fiber connection structures in an optical fiber connection structure of the related art.

DESCRIPTION OF EMBODIMENTS

Technical Problem

Figure 1:
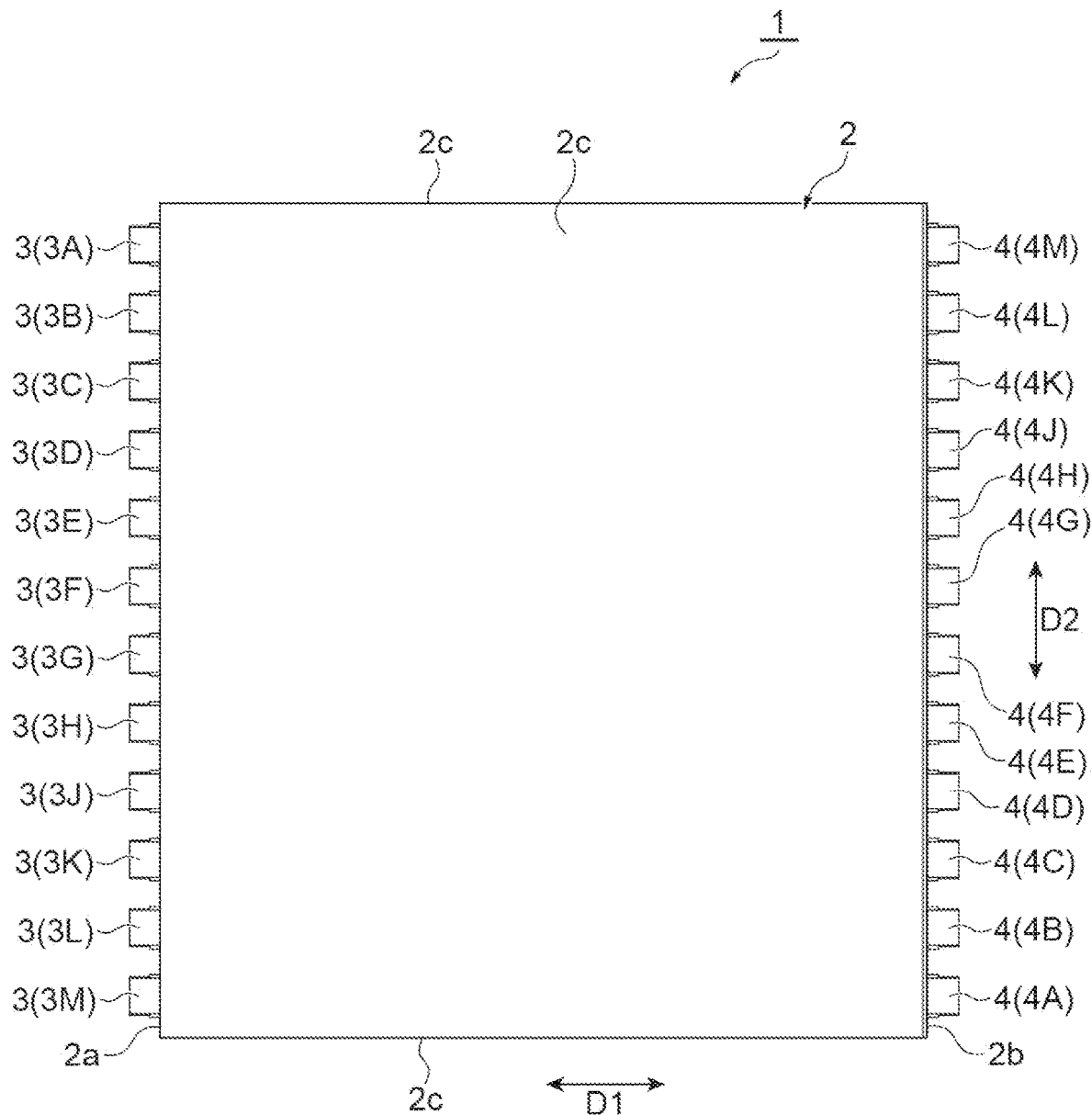
FIG. 1 is a plan view showing a module according to a first embodiment.

The above-described optical fiber connection structure to which the plurality of optical fibers are wired includes four optical fiber groups in which the arrangement orders of the colors of the optical fibers are different from each other. However, in the optical fiber connection structure, since the arrangement order of the colors of the optical fibers completely differs for each fiber group, it is not possible to easily perform wiring work, which is a concern. Particularly, it is assumed that it is difficult to perform work of arranging the optical fibers before wiring.

An object of one aspect of the present disclosure is to provide a fiber connection structure with optical connectors, and a module in which it is possible to easily perform wiring work on a plurality of optical fibers.

Advantageous Effects of Invention

According to one aspect of the present disclosure, it is possible to easily perform wiring work on the plurality of optical fibers.

DESCRIPTION OF EMBODIMENTS

Initially, contents of embodiments of the present disclosure will be listed and described. A fiber connection structure with optical connectors according to one embodiment includes: a plurality of optical fibers; a plurality of first connector port groups each including a plurality of optical fiber holding holes to which one ends of the plurality of optical fibers are wired; and a plurality of second connector port groups each including a plurality of optical fiber holding holes to which the other ends of the plurality of optical fibers are wired. n optical fibers are wired to each of in first connector port groups, where in is a natural number satisfying 2≤m and n is a natural number satisfying 2≤n. m optical fibers are wired to each of n second connector port groups. One optical fiber from one first connector port group is wired to each of the n second connector port groups. The n optical fibers are wired to the one first connector port group in an arranged state. The in optical fibers are wired to one second connector port group in an arranged state. Among the n optical fibers wired to the one first connector port group, a color of a kth optical fiber and a color of an (n−k+1)th optical fiber are different from each other, where k is a natural number satisfying 1≤k≤n. Among the in first connector port groups, arrangement orders of colors of the plurality of optical fibers in (2×j−1)th first connector port groups are the same, where j is a natural number satisfying 1≤j and 2×j≤m. Among the in first connector port groups, arrangement orders of the colors of the plurality of optical fibers in (2×j)th first connector port groups are the same. The arrangement order of the colors of the plurality of optical fibers in the (2×j)th first connector port group is a reverse order of the arrangement order of the colors of the plurality of optical fibers in the (2×j−1)th first connector port group.

In the fiber connection structure with optical connectors according to one embodiment, the n optical fibers are wired to each of the in first connector port groups, and the in optical fibers are wired to each of the n second connector port groups. In the first connector port group, among the arranged n optical fibers, the color of the kth optical fiber and the color of the (n−k+1)th optical fiber are different from each other. In addition, among the in first connector port groups, the arrangement orders of the colors of the optical fibers in the (2×j−1)th first connector port groups are the same, and the arrangement orders of the colors of the optical fibers in the (2×j)th first connector port groups are the same. Therefore, the arrangement orders of the colors of the optical fibers in odd-numbered first connector port groups are the same, and the arrangement orders of the colors of even-numbered first connector port groups are the same, so that it is possible to easily perform wiring work of arranging the optical fibers. In addition, the arrangement order of the colors of the plurality of optical fibers in the (2×j)th first connector port group is a reverse order of the arrangement order of the colors of the plurality of optical fibers in the (2×j−1)th first connector port group. Therefore, whether the first connector port group is an odd-numbered first connector port group or an even-numbered first connector port group can be identified by looking at the arrangement order of the colors of the optical fibers, so that it is possible to more easily perform wiring work on the optical fibers.

A fiber connection structure with optical connectors according to another embodiment includes: a plurality of optical fibers; a plurality of first connector port groups each including a plurality of optical fiber holding holes to which one ends of the plurality of optical fibers are wired; and a plurality of second connector port groups each including a plurality of optical fiber holding holes to which the other ends of the plurality of optical fibers are wired. n optical fibers are wired to each of in first connector port groups, where in is a natural number satisfying 2≤m and n is a natural number satisfying 2≤n. m optical fibers are wired to each of n second connector port groups. One optical fiber from one first connector port group is wired to each of the n second connector port groups. The n optical fibers are wired to the one first connector port group in an arranged state. The in optical fibers are wired to one second connector port group in an arranged state. Among the n optical fibers wired to the one first connector port group, a color of a kth optical fiber and a color of an (n−k+1)th optical fiber are different from each other, where k is a natural number satisfying 1≤k≤n. The optical fibers having two colors among colors of the optical fibers wired to the one first connector port group are wired to the one second connector port group. In the one second connector port group, the colors of the optical fibers disposed adjacent to each other are different from each other.

In the fiber connection structure with optical connectors according to another embodiment, similarly to the fiber connection structure with optical connectors according to one embodiment described above, among the arranged n optical fibers in the first connector port group, the color of the kth optical fiber and the color of the (n−k+1)th optical fiber are different from each other. In addition, the optical fibers having two colors among the colors of the optical fibers wired to the one first connector port group are wired to the one second connector port group, and the colors of the optical fibers disposed adjacent to each other in the second connector port group are different from each other. Therefore, in each of the second connector port groups, the number of the colors of the optical fibers is two and the colors of the optical fibers adjacent to each other are different from each other, so that it is possible to easily perform wiring work on the optical fibers compared to a case where all the colors of the optical fibers are different.

m may be a natural number satisfying 3≤m, and n may be a natural number satisfying 3≤n.

In the fiber connection structure with optical connectors described above, at least some of the n optical fibers wired to each of the first connector port groups may be ribbonized, and at least some of the in optical fibers wired to each of the second connector port groups may be ribbonized. In this case, it is possible to easily perform the wiring and the management of the n optical fibers of each of the first connector port groups and of the in optical fibers of each of the second connector port groups.

Each of the plurality of optical fibers may wire a qth optical fiber holding hole of a pth first connector port group among the in first connector port groups to a pth optical fiber holding hole of a qth second connector port group among the n second connector port groups, where p is a natural number satisfying 1≤p≤m and q is a natural number satisfying 1≤q≤n. In this case, the qth optical fiber holding hole of the pth first connector port group and the pth optical fiber holding hole of the qth second connector port group are wired by the optical fiber. Therefore, in each of the first connector port group and the second connector port group, it is possible to easily figure out the position of the optical fiber holding hole to which the optical fiber is wired, so that it is possible to more easily perform the wiring of the optical fibers.

The fiber connection structure with optical connectors described above may further include a plurality of first multi-core connectors; and a plurality of second multi-core connectors. One first multi-core connector may include two first connector port groups, and the two first connector port groups may be disposed in parallel to each other in the one first multi-core connector. One second multi-core connector may include two second connector port groups, and the two second connector port groups may be disposed in parallel to each other in the one second multi-core connector. In this case, the first multi-core connector includes two rows of the first connector port groups, and the second multi-core connector includes two rows of the second connector port groups. Therefore, the fiber connection structure with optical connectors is applicable to a two-row multi-core connector having high versatility.

The fiber connection structure with optical connectors described above may further include a plurality of first multi-core connectors; and a plurality of second multi-core connectors. One first multi-core connector may include one first connector port group, and one second multi-core connector may include one second connector port group. In this case, the first multi-core connector includes one first connector port group, and the second multi-core connector includes one second connector port group. Therefore, one row of the optical fiber holding holes can be formed in each of the first multi-core connector and the second multi-core connector, so that the fiber connection structure with optical connectors is applicable to a one-row multi-core connector having high versatility.

In the fiber connection structure with optical connectors described above, both the first multi-core connector and the second multi-core connector may be 24-core connectors, to each of which 24 optical fibers are connected. In this case, since both the first multi-core connector and the second multi-core connector are 24-core connectors, the fiber connection structure with optical connectors is applicable to a 24-core multi-core connector having high versatility.

The fiber connection structure with optical connectors described above may further include in first multi-core connectors; and n second multi-core connectors. One first multi-core connector may include one first connector port group. A (2×j−1)th first multi-core connector may include a first identification portion, and a (2×j)th first multi-core connector may include a second identification portion. The (2×j−1)th first multi-core connector and the (2×j)th first multi-core connector may be recognizable by visually recognizing the first identification portion and the second identification portion. In this case, it is possible to identify an odd-numbered first multi-core connector and an even-numbered second multi-core connector by visually recognizing the first identification portion and the second identification portion. Therefore, it is possible to identify the odd-numbered first multi-core connector and the even-numbered first multi-core connector, so that it is possible to easily perform the connection of the plurality of optical fibers to the first connector port group of the odd-numbered first multi-core connector and the connection of the plurality of optical fibers to the first connector port group of the even-numbered first multi-core connector. In addition, it is possible to prevent from mistaking the optical fibers to be connected to the odd-numbered first connector port group and the optical fibers to be connected to the even-numbered first connector port group for each other.

A module according to one embodiment includes: the fiber connection structure with optical connectors described above; a first adapter to which the first multi-core connector is connected; a first wall surface that exposes and supports the first adapter; a second adapter to which the second multi-core connector is connected; and a second wall surface that exposes and supports the second adapter. The fiber connection structure with optical connectors optically connects the first adapter and the second adapter. Since the module includes the fiber connection structure with optical connectors described above, it is possible to obtain the same effects as described above.

The module described above may further include a housing having the first wall surface, the second wall surface facing the first wall surface, and a third wall surface connecting the first wall surface and the second wall surface. The housing may house the fiber connection structure with optical connectors.

DETAILS OF EMBODIMENTS

Specific examples of a fiber connection structure with optical connectors and of a module according to embodiments of the present disclosure will be described with reference to the drawings. It is intended that the present disclosure is not limited to the following examples and includes all changes within the concept and the scope implied by the claims and equivalent to the claims. In the description of the drawings, the same or corresponding elements are denoted by the same reference signs, and a duplicated description will be appropriately omitted. In addition, the drawings may be partially depicted in a simplified manner or in an exaggerated manner for the ease of understanding, and dimensional ratios and the like are not limited to those described in the drawings.

First Embodiment

Figure 2:
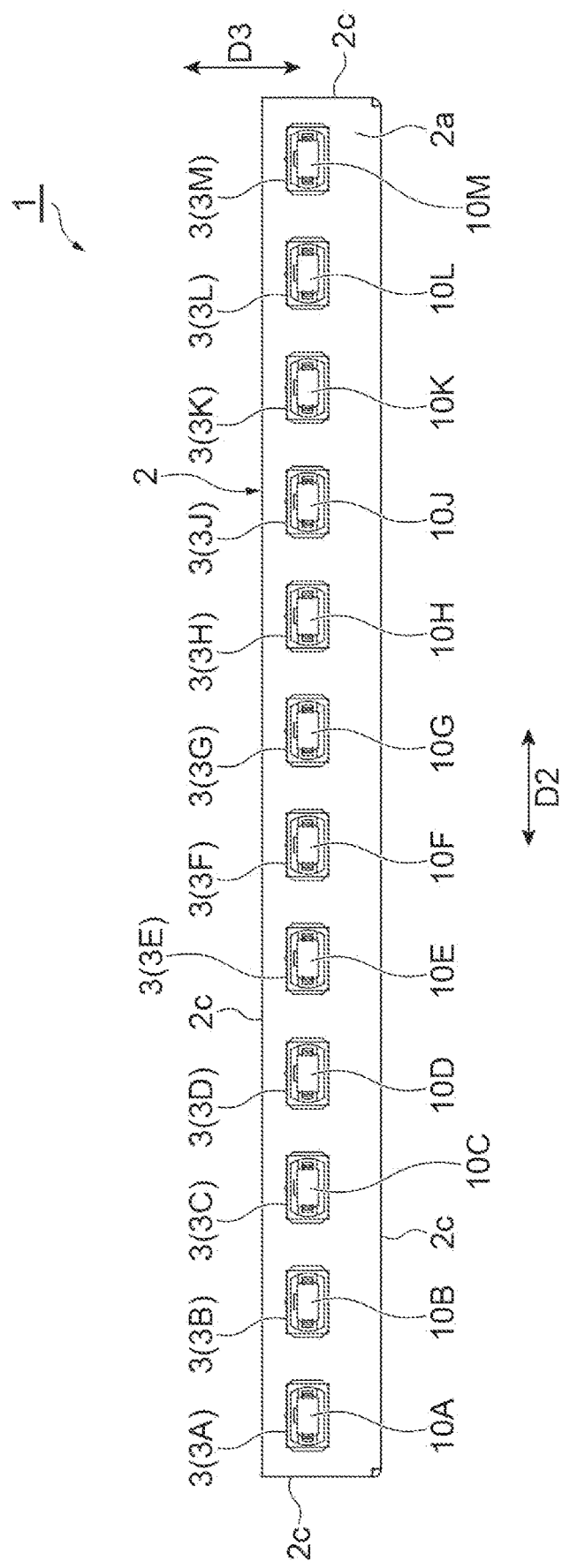
FIG. 2 is a side view showing the module of FIG. 1.
Figure 3:
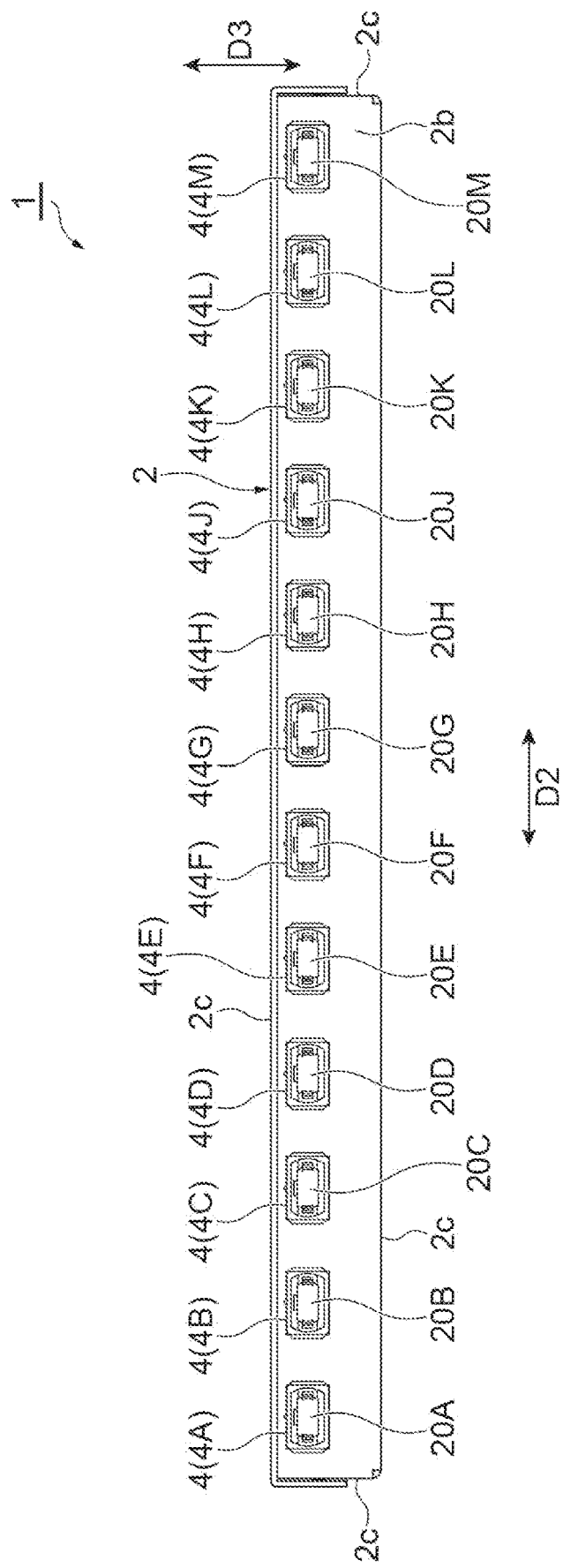
FIG. 3 is a side view of the module of FIG. 1 showing a side opposite of FIG. 2.

FIG. 1 is a plan view showing an exemplary module 1 according to a first embodiment. FIG. 2 is a side view of the module 1. FIG. 3 is a side view of the module 1 showing side opposite FIG. 2. The module 1 according to the present embodiment includes a fiber connection structure 30 with optical connectors including a plurality of optical fibers F (refer to FIG. 5), and the fiber connection structure 30 with optical connectors is built-in in the module 1. As shown in FIGS. 1 to 3, as one example, the module 1 is a cassette type device to be attached to a rack of a data center, and forms an optical wiring shelf of the rack. The module 1 includes a housing 2 having a rectangular box shape extending in a first direction D1, a second direction D2, and a third direction D3 which is a high direction. For example, the module 1 is attached to each of a plurality of chassis that are attached to and detached from the rack. Incidentally, the module 1 may be attached to the rack via a member (for example, an MPO cassette base) other than the chassis.

The housing 2 has a first wall surface 2a facing one side in the first direction D1, a second wall surface 2b facing the other side in the first direction D1, and four third wall surfaces 2c connecting the first wall surface 2a and the second wall surface 2b. A first adapter 3 is supported on the first wall surface 2a in an exposed state, and a second adapter 4 is supported on the second wall surface 2b in an exposed state. For example, the module 1 includes a plurality of the first adapters 3 and a plurality of the second adapters 4. However, at least one of the number of the first adapters 3 and the number of the second adapters 4 may be singular, and the numbers can be appropriately changed.

For example, the module 1 includes 12 first adapters 3 and 12 second adapters 4. Hereinafter, for identification purpose, the 12 first adapters 3 each are referred to as a first adapter 3A, a first adapter 3B, a first adapter 3C, a first adapter 3D, a first adapter 3E, a first adapter 3F, a first adapter 3G, a first adapter 3H, a first adapter 3J, a first adapter 3K, a first adapter 3L, and a first adapter 3M. In addition, for identification purpose, the 12 second adapters 4 are referred to as a second adapter 4A, a second adapter 4B, a second adapter 4C, a second adapter 4D, a second adapter 4E, a second adapter 4F, a second adapter 4G, a second adapter 4H, a second adapter 4J, a second adapter 4K, a second adapter 4L, and a second adapter 4M.

For example, the first adapters 3A to 3M are linearly disposed side by side on the first wall surface 2a. On the first wall surface 2a, the first adapter 3A indicates the first adapter 3 that is the first from the left, the first adapter 3B indicates the first adapter 3 that is the second from the left, the first adapter 3C indicates the first adapter 3 that is the third from the left, the first adapter 3D indicates the first adapter 3 that is the fourth from the left, the first adapter 3E is the first adapter 3 that is fifth from the left, the first adapter 3F is the first adapter 3 that is the sixth from the left, the first adapter 3G indicates the first adapter 3 that is the seventh from the left, the first adapter 3H indicates the first adapter 3 that is eighth from the left, the first adapter 3J indicates the first adapter 3 that is the ninth from the left, the first adapter 3K indicates the first adapter 3 that is the tenth from the left, the first adapter 3L indicates the first adapter 3 that is the eleventh from the left, and the first adapter 3M indicates the first adapter 3 that is the twelfth from the left.

For example, the second adapters 4A to 4M are linearly disposed side by side on the second wall surface 2b, and the disposition of the second adapter 4A to 4M on the second wall surface 2b is the same as the disposition of the first adapters 3A to 3M on the first wall surface 2a. However, the disposition of the first adapters 3A to 3M on the first wall surface 2a and the disposition of the second adapters 4A to 4M on the second wall surface 2b are not limited to the above-described example and can be appropriately changed.

First multi-core connectors 10A to 10M are connected to the insides of the first adapters 3A to 3M, respectively, and second multi-core connectors 20A to 20M are connected to the insides of the second adapters 4A to 4M, respectively. As one example, each of the first multi-core connectors 10A to 10M is a 12-core (including 12 optical fibers) MPO connector, and an optical transceiver is connected to each of the first multi-core connectors 10A to 10M. Similarly to the first multi-core connectors 10A to 10M, each of the second multi-core connectors 20A to 20M is, for example, a 12-core MPO connector. Each of the first multi-core connectors 10A to 10M and each of the second multi-core connectors 20A to 20M may be the same multi-core connectors or may be different multi-core connectors.

Figure 4:
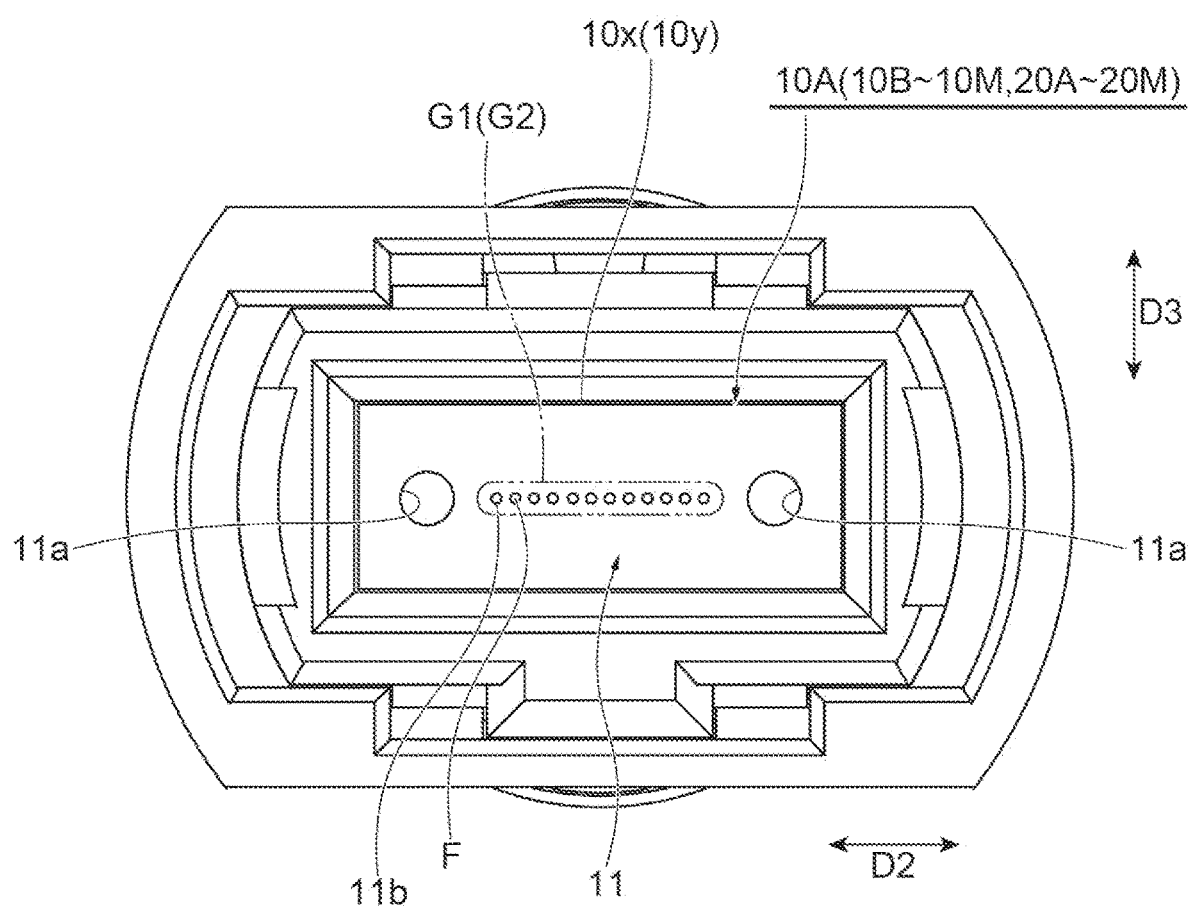
FIG. 4 is a view showing an example of a multi-core connector of a fiber connection structure with optical connectors of the module of FIG. 1.

FIG. 4 is a front view showing the first multi-core connector 10A. As described above, since configurations of the first multi-core connectors 10B to 10M and configurations of the second multi-core connectors 20A to 20M can be made the same as the configuration of the first multi-core connector 10A, hereinafter, a detailed description of the first multi-core connectors 10B to 10M and the second multi-core connectors 20A to 20M will be omitted. As shown in FIG. 4, the first multi-core connector 10A includes, for example, a ferrule 11 including a plurality of guide holes 11a and a plurality of optical fiber holding holes 11b, and the plurality of optical fibers F inserted into the plurality of respective optical fiber holding holes 11b.

As one example, a pair of the guide holes 11a are formed in an end surface of the ferrule 11. The plurality of optical fiber holding holes 11b are formed between the pair of guide holes 11a along the second direction D2. The number of the optical fiber holding holes 11b is, for example, 12, and a standardized 12-core MPO connector is suitably used. One end of the optical fiber F is inserted into each of the plurality of optical fiber holding holes 11b, and each of the optical fibers F inserted into the optical fiber holding holes 11b extends to any one of the second multi-core connectors 20A to 20M. Incidentally, the optical fibers F may be inserted into some of the plurality of optical fiber holding holes 11b instead of all the plurality of optical fiber holding holes 11b.

For example, the module 1 includes in (in is a natural number satisfying 2≤m) first multi-core connectors 10 (as one example, the first multi-core connectors 10A to 10M), and each of the in first multi-core connectors 10 includes a first connector port group G1 including n (n is a natural number satisfying 2≤n) optical fiber holding holes 11b. In other words, n optical fibers F are wired to each of the first connector port groups G1.

Among the in first multi-core connectors 10, a (2×j−1)th (j is a natural number satisfying 1≤j and 2×j in, and odd-numbered) first multi-core connector 10 includes a first identification portion 10x, and a (2×j)th (even-numbered) first multi-core connector 10 includes a second identification portion 10y. The first identification portion 10x and the second identification portion 10y are portions that make it possible to identify an odd-numbered first multi-core connector 10 and an even-numbered first multi-core connector 10, and are, for example, colors of housings of the first multi-core connectors 10. In this case, the color of the first identification portion 10x on a housing of the odd-numbered first multi-core connector 10 and the color of the second identification portion 10y on a housing of the even-numbered first multi-core connector 10 are different from each other.

However, the first identification portion 10x and the second identification portion 10y may be configured other than having different colors, and may be portions having, for example, different patterns (as one example, marks) or different shapes. In such a manner, the odd-numbered first multi-core connector 10 and the even-numbered first multi-core connector 10 are provided with the first identification portion 10x and the second identification portion 10y, respectively, so that the odd-numbered first multi-core connector 10 and the even-numbered first multi-core connector 10 can be identified. Further, both the first identification portion 10x and the second identification portion 10y may be identifiable by positively providing only one thereof, and by not providing anything special at a portion corresponding to the other identification portion.

In addition, the module 1 includes n second multi-core connectors 20 (as one example, the second multi-core connectors 20A to 20M), and each of the n second multi-core connectors 20 includes a second connector port group G2 including in optical fiber holding holes 11b. In other words, in optical fibers F are wired to each of the second connector port groups G2. In the present embodiment, an example will be described in which the value of each of in and n is 12.

Figure 5:
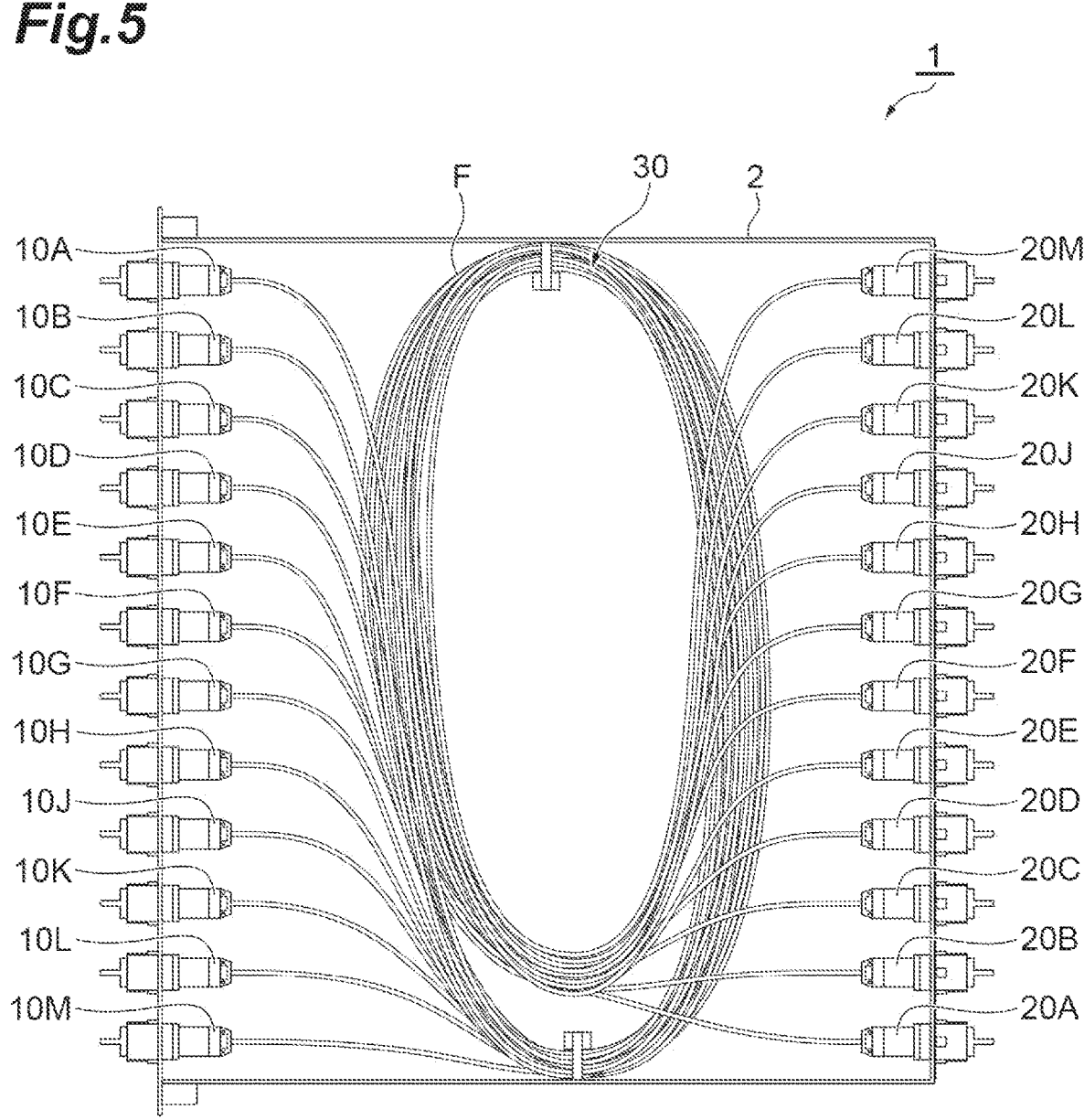
FIG. 5 is a view showing a plurality of optical fibers in the fiber connection structure with optical connectors according to the first embodiment.

FIG. 5 is a view schematically showing an internal structure of the module 1. As shown in FIG. 5, the second multi-core connectors 20A to 20M each are shuffled and connected to the first multi-core connectors 10A to 10M each via the plurality of optical fibers F. In the present embodiment, at least some of the n optical fibers F wired to each of the first multi-core connectors 10A to 10M are ribbonized, and at least some of the in optical fibers F wired to the second multi-core connectors 20A to 20M are ribbonized. In the specification, the term "taping" refers to the optical fiber F that is a ribbon fiber, or to the plurality of optical fibers F that are ribbonized. The ribbon fiber is a plurality of optical fibers in which the plurality of optical fibers F are arranged side by side along one direction and are fixed in advance, and the ribbonizing refers to the plurality of optical fibers F that are fixed with an adhesive agent or the like in a state where the plurality of optical fibers F are arranged along one direction.

As described above, for example, the plurality of optical fibers F inside the module 1 may be such that at least some of single-core optical fibers are bundled. Namely, at least some of the optical fibers F inside the module 1 may be a ribbon fiber or bundled by ribbonizing. In addition, the plurality of optical fibers F forming the fiber connection structure 30 with optical connectors may be provided as a single wire cable instead of being in a bundle mode. As described above, the mode of disposition of the plurality of optical fibers F in the fiber connection structure 30 with optical connectors can be appropriately changed.

Each of the optical fibers F of the fiber connection structure 30 with optical connectors has a color which makes it possible to identify that the optical fiber F extends from which first multi-core connector 10 among the first multi-core connectors 10A to 10M to which second multi-core connector 20 among the second multi-core connectors 20A to 20M. FIG. 6A is a table showing colors of the optical fibers F wired to the first multi-core connectors 10A to 10M. FIG. 6B is a table showing colors of the optical fibers F wired to the second multi-core connectors 20A to 20M. As shown in FIGS. 6A and 6B, the plurality of optical fibers F according to the present embodiment have 12 types of different colors. Incidentally, FIGS. 6A and 6B show an example in which the optical fibers F having 12 types of colors such as blue, orange, green, brown, gray, white, red, black, yellow, purple, pink, and light blue are provided, but the types of colors are not limited to the above example and can be appropriately changed. Hereinafter, examples of a mode in which a color is assigned to each of the plurality of optical fibers F will be described.

Hereinafter, an example will be described in which one first multi-core connector 10 includes one first connector port group G1 and one second multi-core connector 20 includes one second connector port group G2. Specifically, the first connector port group G1 of the first multi-core connector 10A will be described as a first of the first connector port groups G1, the first connector port group G1 of the first multi-core connector 10B will be described as a second of the first connector port groups G1, the first connector port group G1 of the first multi-core connector 10C will be described as a third of the first connector port groups G1, the first connector port group G1 of the first multi-core connector 10D will be described as a fourth of the first connector port groups G1, the first connector port group G1 of the first multi-core connector 10E will be described as a fifth of the first connector port groups G1, the first connector port group G1 of the first multi-core connector 10F will be described as a sixth of the first connector port groups G1, the first connector port group G1 of the first multi-core connector 10G will be described as a seventh of the first connector port groups G1, the first connector port group G1 of the first multi-core connector 10H will be described as an eighth of the first connector port groups G1, the first connector port group G1 of the first multi-core connector 10J will be described as a ninth of the first connector port groups G1, the first connector port group G1 of the first multi-core connector 10K will be described as a tenth of the first connector port groups G1, the first connector port group G1 of the first multi-core connector 10L will be described as an eleventh of the first connector port groups G1, and the first connector port group G1 of the first multi-core connector 10M will be described as a twelfth of the first connector port groups G1. Similarly, the second connector port groups G2 of the second multi-core connectors 20A to 20M will be described as a first to a twelfth of the second connector port groups G2.

One optical fiber F from one first connector port group G1 among the first to the twelfth of the first connector port groups G1 is wired to each of the n (for example, n=12) second connector port groups G2. In addition, the n optical fibers F are wired to one first connector port group G1 in an arranged state, and the in optical fibers F are wired to one second connector port group G2 in an arranged state. In the example of FIG. 6A, in the first of the first connector port groups G1, the optical fiber F of blue color, the optical fiber F of orange color, the optical fiber F of green color, the optical fiber F of brown color, the optical fiber F of gray color, the optical fiber F of white color, the optical fiber F of red color, the optical fiber F of black color, the optical fiber F of yellow color, the optical fiber F of purple color, the optical fiber F of pink color, and the optical fiber F of light blue color are arranged in order.

In addition, each of the plurality of optical fibers F wires a qth (q is a natural number satisfying 1 q n) optical fiber holding hole 11b of a pth (p is a natural number satisfying 1≤p≤m) first connector port group G1 among the in (for example, m=12) first connector port groups G1 to a pth optical fiber holding hole 11b of a qth second connector port group G2 among the n second connector port groups G2.

For example, a first optical fiber holding hole 11b of the first of the first connector port groups G1 and a first optical fiber holding hole 11b of the first of the second connector port groups G2 are wired by the optical fiber F of blue color. A second optical fiber holding hole 11b of the first of the first connector port groups G1 and a first optical fiber holding hole 11b of the second of the second connector port groups G2 are wired by the optical fiber F of orange color. Hereinafter, similarly, a twelfth optical fiber holding hole 11b of the first of the first connector port groups G1 and a first optical fiber holding hole 11b of the twelfth of the second connector port groups G2 are wired by the optical fiber F of light blue color. However, as an example different from the above example, the first optical fiber holding hole 11b of the first of the first connector port groups G1 may be wired to a (2×x−1)th (x is a natural number satisfying 1≤x and 2×x≤n, for example, third) optical fiber holding hole 11b of the first of the second connector port groups G2 by the optical fiber F of the same color (for example, blue).

For example, a first optical fiber holding hole 11b of the second of the first connector port groups G1 and a second optical fiber holding hole 11b of the first of the second connector port groups G2 are wired by the optical fiber F of light blue color. A first optical fiber holding hole 11b of the third of the first connector port groups G1 and a third optical fiber holding hole 11b of the first of the second connector port groups G2 are wired by the optical fiber F of blue color. Hereinafter, similarly, a first optical fiber holding hole 11b of the twelfth of the first connector port groups G1 and a twelfth optical fiber holding hole 11b of the first of the second connector port groups G2 are wired by the optical fiber F of light blue color.

Among the n optical fibers F wired to one first connector port group G1, the color of a kth (k is a natural number satisfying 1≤k≤n) optical fiber F and the color of an (n−k+1)th optical fiber F are different from each other. Examples of this include a case where among 12 optical fibers F wired to the third of the first connector port groups G1, the color of a sixth optical fiber F is white and the color of a seventh optical fiber F is red.

In addition, the arrangement orders of the colors of the optical fibers F in (2×j−1)th (j is a natural number satisfying 1≤j and 2×j in) first connector port groups G1 are the same, and the arrangement orders of the optical fibers F in (2×j)th first connector port groups G1 are the same. Examples of this include a case where the arrangement order of the colors of the optical fibers F in the first of the first connector port groups G1 and the arrangement order of the colors of the optical fibers F in the ninth of the first connector port groups G1 are the same, and a case where the arrangement order of the colors of the optical fibers F in the fourth of the first connector port groups G1 and the arrangement order of the colors of the optical fibers F in the tenth of the first connector port groups G1 are the same.

Then, the arrangement order of the colors of the plurality of optical fibers F in the (2×j)th first connector port group G1 is a reverse order of the arrangement order of the colors of the plurality of optical fibers F in the (2×j−1)th first connector port group G1. As one example, the arrangement order of 12 optical fibers F in the tenth of the first connector port groups G1 is "light blue, pink, purple, yellow, black, red, white, gray, brown, green, orange, and blue", whereas the arrangement order of 12 optical fibers F in the ninth of the first connector port groups G1 is "blue, orange, green, brown, gray, white, red, black, yellow, purple, pink, and light blue".

In addition, the optical fibers F having two colors among the colors of the optical fibers F wired to one first connector port group G1 are wired to one second connector port group G2. For example, the optical fibers F of gray color and black color among the 12 types of colors of the optical fibers F wired to one first connector port group G1 are wired to the fifth of the second connector port groups G2, and the optical fibers F of pink color and orange color are wired to the eleventh of the second connector port groups G2. Then, in one second connector port group G2, the colors of the optical fibers F disposed adjacent to each other are different from each other. For example, in the sixth of the second connector port groups G2, the colors of the optical fibers F disposed adjacent to each other are white and red and different from each other.

The details of the colors of the optical fibers F in the fiber connection structure 30 with optical connectors have been described above. However, the colors of the optical fibers F in the fiber connection structure 30 with optical connectors are not limited to the above-described example, and can be appropriately changed. Hereinafter, the configurations and the actions and effects of the fiber connection structure 30 with optical connectors and of the module 1 will be described.

In the fiber connection structure 30 with optical connectors, and in the module 1, the n optical fibers F are wired to each of the in first connector port groups G1, and the in optical fibers F are wired to each of the n second connector port groups G2. In the first connector port group G1, among the arranged n optical fibers F, the color of the kth optical fiber F and the color of the (n−k+1)th optical fiber F are different from each other. In addition, among the in first connector port groups G1, the arrangement orders of the optical fibers F in the (2×j−1)th first connector port groups G1 are the same, and the arrangement orders of the optical fibers F in the (2×j)th first connector port groups G1 are the same.

Therefore, the arrangement orders of the colors of the optical fibers F in odd-numbered first connector port groups G1 are the same, and arrangement orders of the colors of the optical fiber F of even-numbered first connector port groups G1 are the same, so that it is possible to easily perform wiring work of arranging the optical fibers F. In addition, the arrangement order of the colors of the plurality of optical fibers F in the (2×j)th first connector port group G1 is a reverse order of the arrangement order of the colors of the plurality of optical fibers F in the (2×j−1)th first connector port group G1. Therefore, whether the first connector port group G1 is an odd-numbered first connector port group G1 or an even-numbered first connector port group G1 can be identified by looking at the arrangement order of the colors of the optical fibers F, so that it is possible to more easily perform wiring work on the optical fibers F.

For example, as shown in FIGS. 9A and 9B, in a fiber connection structure with optical connectors of the related art, the optical fibers F having only one color among the colors of the optical fibers F wired to one first connector port group G1 are wired to one second connector port group G2. For example, only the optical fibers F of blue color are wired to the first of the second connector port groups G2. Therefore, there may be problem that it is not possible to determine which first connector port group G1 the optical fiber F of the one color (for example, blue) extends from. In this case, there is a possibility that the optical fibers F are incorrectly positioned.

On the other hand, in the fiber connection structure 30 with optical connectors according to the present embodiment, the optical fibers F having two colors among the colors of the optical fibers F wired to one first connector port group G1 are wired to one second connector port group G2, and the colors of the optical fibers F disposed adjacent to each other in the second connector port group G2 are different from each other. Therefore, in each of the second connector port groups G2, the colors of the optical fibers F are two colors and the colors of the optical fibers F adjacent to each other are different from each other, so that it is possible to easily perform wiring work on the optical fibers F compared to a case where all the colors of the optical fibers F are the same and to a case where the colors of all the optical fibers F are different from each other. Then, it is possible to reduce a possibility that the optical fibers F are incorrectly positioned.

As described above, at least some of the n optical fibers F wired to each of the first connector port groups G1 are taped, and at least some of the in optical fibers F wired to each of the second connector port groups G2 may be wired. In this case, it is possible to easily perform the wiring and the management of the n optical fibers F of each of the first connector port groups G1 and of the in optical fibers F of each of the second connector port groups G2.

As described above, each of the plurality of optical fibers F may wire the qth optical fiber holding hole 11b of the pth first connector port group G1 among the in first connector port groups G1 to the pth optical fiber holding hole 11b of the qth second connector port group G2 among the n second connector port groups G2. In this case, in each of the first connector port group G1 and the second connector port group G2, since it is possible to easily figure out the position of the optical fiber holding hole 11b to which the optical fiber F is wired, it is possible to more easily perform the wiring of the optical fibers F.

The fiber connection structure 30 with optical connectors according to the present embodiment includes the plurality of first multi-core connectors 10 and the plurality of second multi-core connectors 20, one first multi-core connector 10 includes one first connector port group G1, and one second multi-core connector 20 includes one second connector port group G2. Namely, the first multi-core connector 10 includes one first connector port group G1, and the second multi-core connector 20 includes one second connector port group G2. Therefore, one row of the optical fiber holding holes 11b can be formed in each of the first multi-core connector 10 and the second multi-core connector 20, so that the fiber connection structure 30 with optical connectors is applicable to a one-row multi-core connector having high versatility.

The fiber connection structure 30 with optical connectors according to the present embodiment may include the in first multi-core connectors 10 and the n second multi-core connectors 20, one first multi-core connector 10 may include one first connector port group G1, the (2×j−1)th first multi-core connector 10 may include the first identification portion 10x, the (2×j)th first multi-core connector 10 may include the second identification portion 10y, and the (2×j−1)th first multi-core connector 10 and the (2×j)th first multi-core connector 10 may be visually recognizable by visually recognizing the first identification portion 10x and the second identification portion 10y.

In this case, it is possible to identify the (2×j−1)th first multi-core connector 10 and the (2×j)th first multi-core connector 10 by visually recognizing the first identification portion 10x and the second identification portion 10y. Therefore, it is possible to identify the odd-numbered first multi-core connector 10 and the even-numbered first multi-core connector 10, so that it is possible to easily perform the connection of the plurality of optical fibers F to the first connector port group G1 of the odd-numbered first multi-core connector 10 and the connection of the plurality of optical fibers F to the first connector port group G1 of the even-numbered first multi-core connector 10. In addition, it is possible to prevent from mistaking the optical fibers F to be connected to the odd-numbered first connector port group G1 and the optical fibers F to be connected to the even-numbered first connector port group G1 for each other.

Second Embodiment

Next, a fiber connection structure with optical connectors according to a second embodiment will be described with reference to FIGS. 7A and 7B. As shown in FIGS. 7A and 7B, the fiber connection structure with optical connectors according to the second embodiment includes a plurality of optical fibers F having six colors instead of a plurality of optical fibers F having 12 colors. Hereinafter, a duplicated description of the first embodiment will be described.

As shown in FIGS. 7A and 7B, the plurality of optical fibers F according to the second embodiment have six types of different colors. FIGS. 7A and 7B show an example in which the optical fibers F having six types of colors such as blue, red, yellow, white, brown, and gray are provided, but the types of colors are not limited to the above example and can be appropriately changed. In the example of FIG. 7A, in the first of the first connector port groups G1, the optical fiber F of blue color, the optical fiber F of red color, the optical fiber F of yellow color, the optical fiber F of white color, the optical fiber F of brown color, the optical fiber F of gray color, the optical fiber F of blue color, the optical fiber F of red color, the optical fiber F of yellow color, the optical fiber F of white color, the optical fiber F of brown color, and the optical fiber F of gray color are arranged in order.

Each of the plurality of optical fibers F wires the qth optical fiber holding hole 11b of the pth first connector port group G1 among the in (for example, m=12) first connector port groups G1 to the pth optical fiber holding hole 11b of the qth second connector port group G2 among the n (for example, n=12) second connector port groups G2.

For example, the first optical fiber holding hole 11b of the first of the first connector port groups G1 and the first optical fiber holding hole 11b of the first of the second connector port groups G2 are wired by the optical fiber F of blue color. The second optical fiber holding hole 11b of the first of the first connector port groups G1 and the first optical fiber holding hole 11b of the second of the second connector port groups G2 are wired by the optical fiber F of red color. Hereinafter, similarly, the twelfth optical fiber holding hole 11b of the first of the first connector port groups G1 and the first optical fiber holding hole 11b of the twelfth of the second connector port groups G2 are wired by the optical fiber F of gray color.

For example, the first optical fiber holding hole 11b of the second of the first connector port groups G1 and the second optical fiber holding hole 11b of the first of the second connector port groups G2 are wired by the optical fiber F of gray color. The first optical fiber holding hole 11b of the third of the first connector port groups G1 and the third optical fiber holding hole 11b of the first of the second connector port groups G2 are wired by the optical fiber F of blue color. Hereinafter, similarly, the first optical fiber holding hole 11b of the twelfth of the first connector port groups G1 and the twelfth optical fiber holding hole 11b of the first of the second connector port groups G2 are wired by the optical fiber F of gray color.

Among the n optical fibers F wired to one first connector port group G1, the color of a kth (k is a natural number satisfying 1≤k≤n) optical fiber F and the color of an (n−k+1)th optical fiber F are different from each other. Examples of this include a case where among 12 optical fibers F wired to the third of the first connector port groups G1, the color of a sixth optical fiber F is gray and the color of a seventh optical fiber F is blue.

In addition, the arrangement orders of the colors of the optical fibers F in the (2×j−1)th first connector port groups G1 are the same, and the arrangement orders of the optical fibers F in the (2×j)th first connector port groups G1 are the same. Then, the arrangement order of the colors of the plurality of optical fibers F in the (2×j)th first connector port group G1 is a reverse order of the arrangement order of the colors of the plurality of optical fibers F in the (2×j−1)th first connector port group G1. As one example, the arrangement order of 12 optical fibers F in the tenth of the first connector port groups G1 is "gray, brown, white, yellow, red, blue, gray, brown, white, yellow, red, and blue", whereas the arrangement order of 12 optical fibers F in the ninth of the first connector port groups G1 is "blue, red, yellow, white, brown, gray, blue, red, yellow, white, brown, and gray".

In addition, the optical fibers F having two colors among the colors of the optical fibers F wired to one first connector port group G1 are wired to one second connector port group G2. For example, the optical fibers F of brown color and red color among the 12 types of colors of the optical fibers F wired to one first connector port group G1 are wired to the fifth of the second connector port groups G2, and the optical fibers F of gray color and blue color are wired to the twelfth of the second connector port groups G2. Then, in one second connector port group G2, the colors of the optical fibers F disposed adjacent to each other are different from each other. For example, in the ninth of the second connector port groups G2, the colors of the optical fibers F disposed adjacent to each other are yellow and white and different from each other.

As described above, in the fiber connection structure with optical connectors according to the second embodiment, among the in first connector port groups G1, the arrangement orders of the optical fibers F in the (2×j−1)th first connector port groups G1 are the same, and the arrangement orders of the optical fibers F in the (2×j)th first connector port groups G1 are the same. Therefore, the arrangement orders of the colors of the optical fibers F in the odd-numbered first connector port groups G1 are the same, and the arrangement orders of the colors of the even-numbered first connector port groups G1 are the same, so that it is possible to easily perform wiring work on the optical fibers F, and it is possible to obtain the same actions and effects as those of the first embodiment.

In addition, in the fiber connection structure with optical connectors, (n/2) types of colors are assigned to the optical fibers F in which the n optical fibers F are arranged. Namely, in the fiber connection structure with optical connectors according to the second embodiment, the colors of only some of the plurality of optical fibers F in the first connector port group G1 are different from each other. Therefore, in the fiber connection structure with optical connectors according to the second embodiment, the plurality of optical fibers F having the same color can be used for the first connector port group G1, so that the use of common components can be promoted, thereby contributing to a reduction in cost.

Third Embodiment

Figure 8:
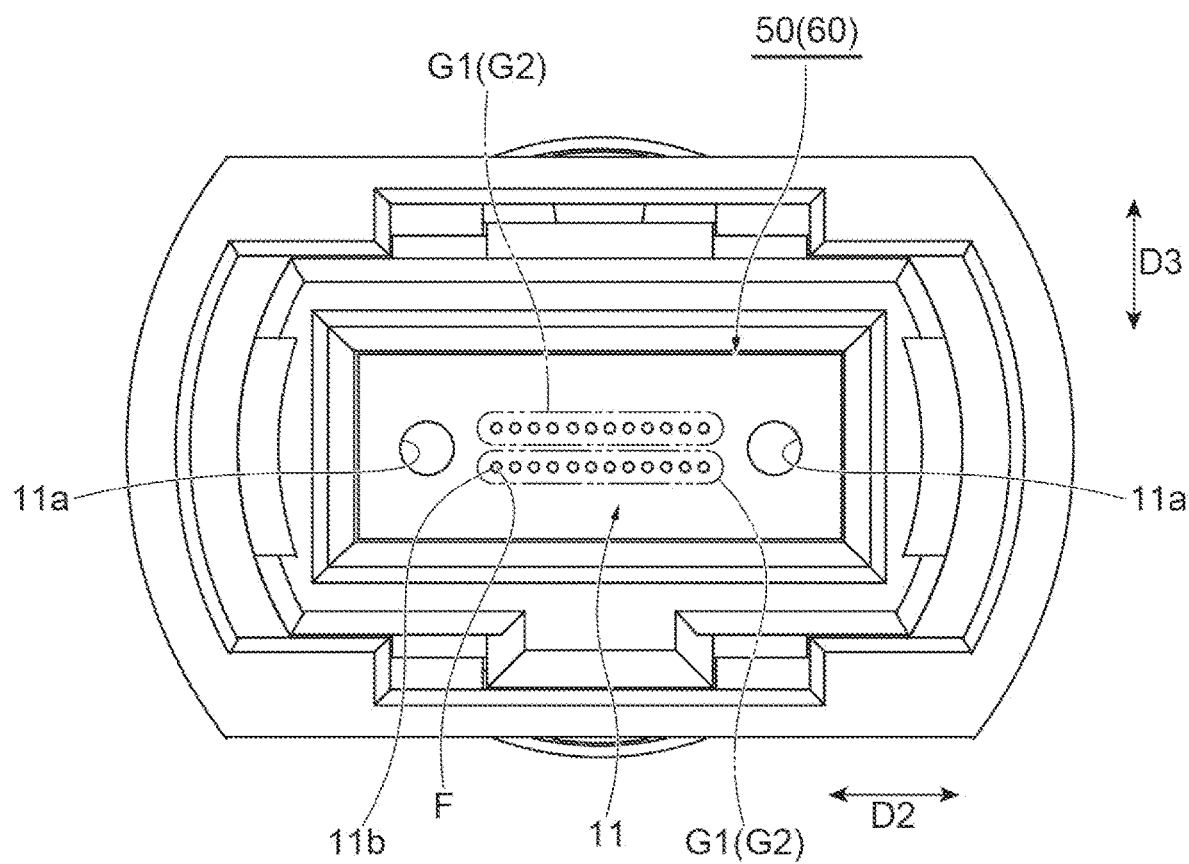
FIG. 8 is a view showing an example of a multi-core connector according to a modification example different from that of FIG. 4.

Subsequently, a fiber connection structure with optical connectors, and a module according to a third embodiment will be described with reference to FIG. 8. The fiber connection structure with optical connectors according to the third embodiment includes first multi-core connectors 50 and second multi-core connectors 60 instead of the first multi-core connectors 10 and the second multi-core connectors 20, and both the first multi-core connector 50 and the second multi-core connector 60 are 24-core connectors, to each of which 24 optical fibers F are connected.

For example, one first multi-core connector 50 includes two first connector port groups G1, and the two first connector port groups G1 are disposed in parallel to each other in the one first multi-core connector 50. One second multi-core connector 60 includes, for example, two second connector port groups G2, and similarly to the first multi-core connector 50, the two second connector port groups G2 are disposed in parallel to each other.

For example, the module according to the third embodiment includes six first multi-core connectors 50 and six second multi-core connectors 60. As one example, a first of the first multi-core connectors 50 (for example, shown in FIG. 6A, 6B, 7A, or 7B) may include a first and a second of the first connector port groups G1, a second of the first multi-core connectors 50 may include a third and a fourth of the first connector port groups G1, a third of the first multi-core connectors 50 may include a fifth and a sixth of the first connector port groups G1, a fourth of the first multi-core connectors 50 may include a seventh and an eighth of the first connector port groups G1, a fifth of the first multi-core connectors 50 may include a ninth and a tenth of the first connector port groups G1, and a sixth of the first multi-core connectors 50 may include an eleventh and a twelfth of the first connector port groups G1. The same configuration applies to the second multi-core connectors 60.

As described above, the fiber connection structure with optical connectors according to the third embodiment includes a plurality of the first multi-core connectors 50 and a plurality of the second multi-core connectors 60, one first multi-core connector 50 includes two rows of the first connector port groups G1, and one second multi-core connector 60 includes two rows of the second connector port groups G2. Therefore, the fiber connection structure with optical connectors is applicable to a two-row multi-core connector having high versatility. In addition, in the third embodiment, since both the first multi-core connector 50 and the second multi-core connector 60 are 24-core connectors, the fiber connection structure with optical connectors is applicable to a 24-core multi-core connector having high versatility.

Each embodiment of the fiber connection structure with optical connectors and of the module according to the present disclosure has been described above. However, the present invention is not limited to the above-described each embodiment and the above-described each example, and various modifications can be made without departing from the concept described in the claims. Namely, the shapes, the sizes, the number, and the mode of disposition of the parts of the fiber connection structure with optical connectors and of the module can be appropriately changed without changing the above concept.

For example, in the above-described embodiments, the fiber connection structure 30 with optical connectors provided in the module 1 has been described. However, the shape and the size of the module to which the fiber connection structure with optical connectors is attached, a mode of attachment of the module to the chassis, and the like are not limited to those of the module 1 described above, and can be appropriately changed. For example, the module is not limited to a module housed in one housing.

In addition, in the above-described embodiments, the first multi-core connector 10 and the second multi-core connector 20 that are 12-core MPO connectors and the first multi-core connector 50 and the second multi-core connector 60 that are 24-core MPO connectors have been described. However, the number of cores of the multi-core connector is not limited to 12 or 24, may be, for example, 16 or 32 (16×2), and can be appropriately changed. Further, the standards of the optical connector are not limited to the MPO and can be appropriately changed.

REFERENCE SIGNS LIST

1: module, 2: housing, 2a: first wall surface, 2b: second wall surface, 2c: third wall surface, 3, 3A, 3B, 3C, 3D, 3E, 3F, 3G, 3H, 3J, 3K, 3L, 3M: first adapter, 4, 4A, 4B, 4C, 4D, 4E, 4F, 4G, 4H, 4J, 4K, 4L, 4M: second adapter, 10, 10A, 10B, 10C, 10D, 10E, 10F, 10G, 10H, 10J, 10K, 10L, 10M, 50: first multi-core connector, 10x: first identification portion, 10y: second identification portion, 11: ferrule, 11a: guide hole, 11b: optical fiber holding hole, 20, 20A to 20M, 60: second multi-core connector, 30: fiber connection structure with optical connectors, D1: first direction, D2: second direction, D3: third direction, F: optical fiber, G1: first connector port group, G2: second connector port group.

The invention claimed is:

1. A fiber connection structure with optical connectors comprising:
a plurality of optical fibers;
a plurality of first connector port groups each including a plurality of optical fiber holding holes to which one ends of the plurality of optical fibers are wired; and
a plurality of second connector port groups each including a plurality of optical fiber holding holes to which the other ends of the plurality of optical fibers are wired,
wherein n optical fibers are wired to each of m first connector port groups, where m is a natural number satisfying 2≤m and n is a natural number satisfying 2≤n,
m optical fibers are wired to each of n second connector port groups,
one optical fiber from one first connector port group is wired to each of the n second connector port groups,
the n optical fibers are wired to the one first connector port group in an arranged state,
the m optical fibers are wired to one second connector port group in an arranged state,
among the n optical fibers wired to the one first connector port group, a color of a kth optical fiber and a color of an (n−k+1)th optical fiber are different from each other, where k is a natural number satisfying 1≤k≤n,
among the m first connector port groups, arrangement orders of colors of the plurality of optical fibers in (2×j−1)th first connector port groups are the same, where j is a natural number satisfying 1≤j and 2×j≤m,
among the m first connector port groups, arrangement orders of the colors of the plurality of optical fibers in (2×j)th first connector port groups are the same, and
the arrangement order of the colors of the plurality of optical fibers in the (2×j)th first connector port group is a reverse order of the arrangement order of the colors of the plurality of optical fibers in the (2×j−1)th first connector port group.

2. A fiber connection structure with optical connectors comprising:
a plurality of optical fibers;
a plurality of first connector port groups each including a plurality of optical fiber holding holes to which one ends of the plurality of optical fibers are wired; and
a plurality of second connector port groups each including a plurality of optical fiber holding holes to which the other ends of the plurality of optical fibers are wired,
wherein n optical fibers are wired to each of m first connector port groups, where m is a natural number satisfying 2≤m and n is a natural number satisfying 2≤n,
m optical fibers are wired to each of n second connector port groups,
one optical fiber from one first connector port group is wired to each of the n second connector port groups,
the n optical fibers are wired to the one first connector port group in an arranged state,
the m optical fibers are wired to one second connector port group in an arranged state,
among the n optical fibers wired to the one first connector port group, a color of a kth optical fiber and a color of an (n−k+1)th optical fiber are different from each other, where k is a natural number satisfying 1≤k≤n,
the optical fibers having two colors among colors of the optical fibers wired to the one first connector port group are wired to the one second connector port group, and
in the one second connector port group, the colors of the optical fibers disposed adjacent to each other are different from each other.

3. The fiber connection structure with optical connectors according to claim 1,
wherein m is a natural number satisfying 3≤m, and n is a natural number satisfying 3≤n.

4. The fiber connection structure with optical connectors according to claim 1,
wherein at least some of the n optical fibers wired to each of the first connector port groups are ribbonized, and
at least some of the m optical fibers wired to each of the second connector port groups are ribbonized.

5. The fiber connection structure with optical connectors according to claim 1,
wherein each of the plurality of optical fibers wires a qth optical fiber holding hole of a pth first connector port group among the m first connector port groups to a pth optical fiber holding hole of a qth second connector port group among the n second connector port groups, where p is a natural number satisfying 1≤p≤m and q is a natural number satisfying 1≤q≤n.

6. The fiber connection structure with optical connectors according to claim 1, further comprising:
a plurality of first multi-core connectors; and
a plurality of second multi-core connectors,
wherein one first multi-core connector includes two first connector port groups, and the two first connector port groups are disposed in parallel to each other in the one first multi-core connector, and one second multi-core connector includes two second connector port groups, and the two second connector port groups are disposed in parallel to each other in the one second multi-core connector.

7. The fiber connection structure with optical connectors according to claim 1, further comprising:
 a plurality of first multi-core connectors; and
 a plurality of second multi-core connectors,
 wherein one first multi-core connector includes one first connector port group, and
 one second multi-core connector includes one second connector port group.

8. The fiber connection structure with optical connectors according to claim 6,
 wherein both the first multi-core connector and the second multi-core connector are 24-core connectors, to each of which 24 optical fibers are connected.

9. The fiber connection structure with optical connectors according to claim 1, further comprising:
 m first multi-core connectors; and
 n second multi-core connectors,
 wherein one first multi-core connector includes one first connector port group,
 a (2×j−1)th first multi-core connector includes a first identification portion,
 a (2×j)th first multi-core connector includes a second identification portion, and
 the (2×j−1)th first multi-core connector and the (2×j)th first multi-core connector are recognizable by visually recognizing the first identification portion and the second identification portion.

10. A module comprising:
 the fiber connection structure with optical connectors according to claim 6;
 a first adapter to which the first multi-core connector is connected;
 a first wall surface that exposes and supports the first adapter;
 a second adapter to which the second multi-core connector is connected; and
 a second wall surface that exposes and supports the second adapter,
 wherein the fiber connection structure with optical connectors optically connects the first adapter and the second adapter.

11. The module according to claim 10, further comprising:
 a housing having the first wall surface, the second wall surface facing the first wall surface, and a third wall surface connecting the first wall surface and the second wall surface,
 wherein the housing houses the fiber connection structure with optical connectors.

* * * * *